US006910589B1

(12) United States Patent
Rose et al.

(10) Patent No.: US 6,910,589 B1
(45) Date of Patent: Jun. 28, 2005

(54) ANNULAR PLEATED FILTER CARTRIDGE FOR LIQUID FILTRATION APPARATUS

(75) Inventors: Stephen W. Rose, Eagle, WI (US); Steven L. Hughes, New Berlin, WI (US)

(73) Assignee: Oberlin Filter Company, Waukesha, WI (US)

( * ) Notice: Subject to any disclaimer, the term of this patent is extended or adjusted under 35 U.S.C. 154(b) by 0 days.

(21) Appl. No.: 09/599,269

(22) Filed: Jun. 22, 2000

(51) Int. Cl.[7] ............................................. B01D 39/00
(52) U.S. Cl. ................... 210/484; 210/489; 210/493.1; 210/493.5
(58) Field of Search .............................. 210/493.1, 483, 210/493.2, 493.5, 496, 499, 503, 505, 510.1, 210/484–485, 488, 489–491, 497.01, 507, 210/493.4; 55/521, 499, 498

(56) References Cited

U.S. PATENT DOCUMENTS

| | | | |
|---|---|---|---|
| 3,042,571 A | * | 7/1962 | Jackson ...................... 156/191 |
| 3,057,481 A | | 10/1962 | Pall |
| 3,169,899 A | | 2/1965 | Steuber |
| 3,306,794 A | * | 2/1967 | Humbert, Jr. |
| 3,403,862 A | | 10/1968 | Dworjanyn |
| 3,485,706 A | | 12/1969 | Evans |
| 3,532,589 A | | 10/1970 | David |
| 3,570,675 A | | 3/1971 | Pall et al. |
| 3,716,436 A | * | 2/1973 | Pall et al. |
| 3,752,321 A | * | 8/1973 | McLaren |
| 3,945,873 A | | 3/1976 | Osborn |
| 4,033,881 A | * | 7/1977 | Pall ........................... 210/491 |
| 4,075,106 A | * | 2/1978 | Yamazaki |
| 4,086,774 A | | 5/1978 | Duggins |
| 4,133,763 A | | 1/1979 | Cooper |
| 4,152,389 A | | 5/1979 | Miller |
| 4,154,688 A | * | 5/1979 | Pall ............................ 210/487 |

(Continued)

FOREIGN PATENT DOCUMENTS

| | | | |
|---|---|---|---|
| WO | WO98/07905 | | 2/1998 |
| WO | WO 98/07905 | * | 2/1998 |
| WO | WO 01/29295 | * | 4/2001 |

OTHER PUBLICATIONS

Polymer Science Dictionary (Alger, Mark, Elsevier Science Publishers, Ltd., c.1989, pp. 205 & 248).*

(Continued)

Primary Examiner—Terry K. Cecil
(74) Attorney, Agent, or Firm—Jansson, Shupe & Munger, Ltd.

(57) ABSTRACT

A pleated filter cartridge for filtering liquids including an annular filter element having a filter material which is a thin non-perforated non-woven material of flash-spun plexifilamentary high-density polyethylene fibrils, the filter material having a pressure drop of less than 4 psid at a flow rate of 10 gal/hr and a filtration efficiency of at least 98% of 1–2 micron particulates at a pressure differential of 30 psid. The filter material preferably has a mean flow pore size greater than 4 microns while its normal pore-size filtration rating is 1 micron, and preferably has a thickness of less than about 0.15 mm, most preferably less than or equal to about 0.13 mm. The filter element preferably has two layers, including a mesh layer, preferably of a low-density polyethylene. The mesh most preferably has a softening temperature range below the lower end of the softening temperature range of the high-density polyethylene filter material, and is tack-point interconnected to the filter material without having compromised the filter material.

14 Claims, 2 Drawing Sheets

U.S. PATENT DOCUMENTS

| | | | |
|---|---|---|---|
| RE30,779 E | | 10/1981 | Cooper |
| 4,402,830 A | | 9/1983 | Pall |
| 4,479,874 A | | 10/1984 | Rosenberg et al. |
| 4,579,698 A | | 4/1986 | Meyering et al. |
| 4,588,464 A | * | 5/1986 | Miyagi et al. |
| 4,609,465 A | | 9/1986 | Miller |
| 4,842,739 A | | 6/1989 | Tang |
| 4,906,371 A | | 3/1990 | Miller |
| 4,929,303 A | | 5/1990 | Sheth |
| 4,929,354 A | | 5/1990 | Meyering et al. |
| 5,023,130 A | | 6/1991 | Simpson et al. |
| 5,064,598 A | | 11/1991 | Seiler |
| 5,084,178 A | | 1/1992 | Miller et al. |
| 5,098,767 A | | 3/1992 | Linnersten |
| 5,152,890 A | | 10/1992 | Linnersten |
| 5,154,827 A | * | 10/1992 | Ashelin et al. ............. 210/490 |
| 5,182,162 A | | 1/1993 | Andrusko |
| 5,185,190 A | | 2/1993 | Grimes |
| 5,252,207 A | * | 10/1993 | Miller et al. ................ 210/335 |
| 5,258,127 A | * | 11/1993 | Gsell et al. ................. 210/767 |
| 5,275,743 A | | 1/1994 | Miller et al. |
| 5,290,443 A | | 3/1994 | Norton |
| 5,290,445 A | | 3/1994 | Buttery |
| 5,360,650 A | | 11/1994 | Grimes |
| 5,435,957 A | | 7/1995 | Degen et al. |
| 5,462,675 A | | 10/1995 | Hopkins et al. |
| 5,476,585 A | | 12/1995 | Mills |
| 5,543,047 A | * | 8/1996 | Stoyell et al. |
| 5,545,323 A | | 8/1996 | Koehler et al. |
| 5,552,048 A | | 9/1996 | Miller et al. |
| 5,593,529 A | | 1/1997 | Grimes |
| 5,605,625 A | | 2/1997 | Mills |
| 5,614,095 A | | 3/1997 | Degen et al. |
| 5,700,304 A | * | 12/1997 | Foo |
| 5,702,603 A | | 12/1997 | Johnson et al. |
| 5,733,452 A | | 3/1998 | Whitlock |
| 5,753,343 A | | 5/1998 | Braun et al. |
| 5,855,784 A | * | 1/1999 | Pike et al. ................. 210/505 |
| 6,034,008 A | * | 3/2000 | Lim et al. |
| 6,046,118 A | | 4/2000 | Jones et al. |
| 6,143,106 A | * | 11/2000 | Shane |
| 6,309,438 B1 | * | 10/2001 | Kanno et al. ................. 55/486 |
| 2002/0179521 A1 | * | 12/2002 | Paul ........................... 210/457 |

OTHER PUBLICATIONS

Materials Handbook (Brady et al.. McGraw-Hill Book Co., 12th edition, pp. 633-634).*

Hawley's Condensed Chemical Dictionary (Lewis, R. Sr. John Wiley & Sons, Inc., 13th edition, pp. 897-898.*

"Ethylene Polymers, HDPE", Encyclopedia of Polymer Science and Technology (web version), John Wiley & Sons, Inc., physical properties pp. 1-6, and abstract and polymer properties pp. 1-5, articles posted online Oct. 22, 2001.*

Ethylene Polymers, LDPE, Encyclopedia of Polymer Science and Technology (web version), John Wiley & Sons, Inc.,abstract and properties, pp.1-5 and uses, pp. 1-12, articles posted online Oct. 22, 2001.*

Hawley's Condensed Chemical Dictionary (Lewis, Richard J. Sr., 13$^{th}$ ed., p. 897).*

Hawley's Condensed Chemical Dictionary (Lewis, Sr. Richard J., 13$^{th}$ ed. pp. 897-899).*

Ethylene Polymers, HDPE (Encyclopedia of Polymer Science and Technology, copywright 2002 by John Wiley & Sons Inc., article online posting date Oct. 22, 2001, pp. 1-6).*

Ethylene Polymers, LDPE (Encyclopedia of Polymer Science and Technology, copywright 2002 by John Wiley & Sons Inc., article online posting date Oct. 22, 2001, pp. 1-12).*

DuPont Tuvek—"The Medium that Fits a Wide Variety of Filtration Needs" Sep. 23, 1997.

E.I. Dupont De Nemours and Company, and Oberlin Filter Company—"Membrane Microfiltration".

U.S. Appl. No. 09/436,587, filed Nov. 9, 1999, Rose.

* cited by examiner

ANNULAR PLEATED FILTER CARTRIDGE FOR LIQUID FILTRATION APPARATUS

FIELD OF THE INVENTION

This invention is related to pleated filter cartridges for liquid filtration of the type having annular pleated filter elements.

BACKGROUND OF THE INVENTION

Pleated filter cartridges with annular pleated filter elements, sometimes referred to as corrugated filters, are used in various liquid filtration applications involving the removal of particulates from liquid streams, such as aqueous liquid streams. Such pleated filter cartridges are removably mountable in liquid-handling apparatus, and are removed and replaced as necessary to maintain desired filtering capabilities.

The variety of liquid filtration applications in industry is great, involving a wide variety of liquid streams, many of which are aqueous liquid streams with a great variety of chemical and particulate constituents in them. Pleated filter cartridges of various diameters, lengths and constructions are used in different applications involving many different liquid streams (aqueous-based and otherwise) and many different kinds of liquid-handling devices.

Pleated filter cartridges typically include an inner rigid perforate tube-like core around which an annular pleated filter element is disposed. The ends of the annular pleated filter element are in sealing engagement with a pair of endcaps, at least one of which has a central aperture in flow communication with the inside of the tube-like core. When mounted in liquid-handling apparatus, the outer circumference of the pleated filter cartridge is typically in contact with the liquid to be filtered. The liquid is filtered as it flows through the annular pleated filter element and into the perforate core. The filtered liquid exits the core through one of the endcaps.

The prior art includes information on a great variety of pleated filter cartridges made using a variety of configurations and a variety of different filter materials and filter material combinations. Among the filter materials are certain non-woven materials, woven materials, fiberglass materials, expanded (or foamed) materials, and various paper-like materials. Sheets of various non-woven materials, primarily polypropylene, nylon and various polyesters, are frequently used as pleated filter materials. Thicknesses of non-woven sheets for pleated annular filter elements usually range from about 0.28 mm to about 0.48 mm, but pleated non-woven filter materials as thin as about 0.17 mm have been used. In some cases, one or more open mesh or net layers are used in pleated structures for spacing, support or flow-facilitating purposes.

Despite the great amount of development activity which has occurred in the field of pleated annular filter cartridges, there are a number of significant continuing problems, needs and shortcomings in the field.

There is a continuing need for pleated annular filter cartridges with a pleated structure having an increased surface area for a given circumferential dimension of the pleated element—or, stated differently, increased filter surface area for a filter of given diameter. In this connection, many pleated filter elements of the prior art have multiple filtering layers, sometimes including different layers for "pre-filtering" and filtering purposes. A common practice is to include in the pleated element a number of layers of the same or differing pore sizes pleated together, usually with coarser layers on the upstream side (i.e., typically the outer side) and the finer layers on the downstream side, so that the coarser layers remove the larger particulates first and the finer layers remove the smallest particulates last. In some cases, the plural layers must be spaced slightly from one another to provide room for accumulation of particulates. These factors limit the pleat density (i.e., the number of pleats for a given circumferential dimension), and thus tend to limit the area of the pleated structure accessible to liquid flow.

Another shortcoming of certain annular pleated filter cartridges of the prior art is the requirement of frequent replacement—i.e., replacement at intervals shorter than may be desired. There is a continuing, well-understood need for improved pleated annular filter elements and cartridges with extended useful lives.

The problem of short life spans of pleated annular filter cartridges, i.e., the need for frequent replacement, in some cases is due in part to limitations in the ability to periodically remove accumulated particulates, such as by backwashing or other filter cleaning operations. There is a continuing need for pleated annular filter cartridges which readily release accumulated particulates, and thereby allow extended usefulness. In certain cases, the filtering materials degrade too quickly in the liquid stream and become unable to function effectively. There is a continuing need for pleated annular filter cartridges which can stand up to liquid streams in filtration without degrading for extended periods of effective filtering, including under intense conditions.

Another on-going need is for pleated filter cartridges able to withstand certain liquid streams—i.e., cartridges which are compatible with such liquid streams. For example, in some cases certain non-woven materials (e.g., polypropylene) widely used in pleated filter cartridges are susceptible to degradation caused by gamma radiation in certain liquid streams. There is a need for improved annular pleated filter elements which are resistant to such degradation in certain liquid streams.

Another concern with certain commercially-available pleated filter cartridges is that they are quite expensive, a concern which is exacerbated by the above-noted need for frequent replacement. There is a need for highly-effective, long-lasting pleated filter cartridges which are relatively inexpensive.

Other pertinent background information which is useful in understanding this invention is included in the detailed descriptions section of this document.

OBJECTS OF THE INVENTION

It is an object of this invention to provide an improved annular pleated filter cartridge for liquid filtration apparatus overcoming some problems and shortcomings of the prior art set forth above.

Another object of this invention is to provide an improved annular pleated filter cartridge with excellent durability in liquid streams, an extended useful life, and excellent filtration capabilities.

Another object is to provide an improved annular pleated filter cartridge allowing increased filter element surface area for a given circumferential dimension of the annular pleated filter.

Still another object of the invention is to provide an improved annular pleated filter cartridge with excellent flow-through and filtering properties and excellent resistance to degradation while used in various filtration liquid streams.

Another object of this invention is to provide an improved annular pleated filter cartridge the useful life of which is extended by an excellent ability to readily release accumulated particulates, by back-washing or other filter-cleaning operations.

Yet another object of this invention is to provide an improved annular pleated filter cartridge with excellent resistance against degradation in certain liquid streams despite extended use therein.

Another object of this invention is to provide an improved annular pleated filter cartridge which is inexpensive, efficient in filtering operations, and usable for extended periods of time.

Another object of this invention is to provide an improved annular pleated filter cartridge having a very thin pleated non-woven filtering material.

These and other objects of the invention will be apparent from the following descriptions.

SUMMARY OF THE INVENTION

The invention is an improved pleated filter cartridge for removing particulates from liquid of the type including a perforate core, a pair of endcaps, and an annular filter element around the core formed by substantially axially-parallel pleats of at least one sheet of filter material, the filter element having opposite ends each in sealing engagement with one of the endcaps. In the improved pleated filter cartridge of this invention, the filter material is a non-perforated non-woven material of flash-spun plexifilamentary high-density polyethylene fibrils, the filter material having a pressure drop of less than 4 psid at a flow rate of 10 gal/hr and a filtration efficiency of at least 98% of 1–2 micron particulates at a pressure differential of 30 psid.

In preferred embodiments, the filter material has a pressure drop of less than about 1.5 psid at a flow rate of 10 gal/hr and the filtration efficiency is at least about 99% of 1–2 micron particulates at a pressure differential of 30 psid. The mean flow pore size of the filter material is preferably greater than 4 microns while its nominal pore-size filtration rating is 1 micron, and the filter material preferably has a Gurley Hill porosity rating no greater than about 5 sec/100 cc. The non-woven filter material used in the pleated filter cartridge of this invention is preferably a form of Tyvek® known as SoloFlo® available from DuPont.

In highly preferred embodiments, the filter material is very thin—having a thickness of less than about 0.15 mm. Most preferably, the filter material has a thickness less than or equal to about 0.13 mm (just over 0.005 inch). The filter material preferably has a basis weight of less than about 45 g/m². An advantage of this thinness is that it allows a greater number of pleats for a given circumferential dimension of an annular pleated filter cartridge, thus providing greater filtering surface area.

In highly preferred embodiments, the annular pleated filter element has at least two layers, including a mesh layer with the filter material. The mesh layer is preferably between the filter material and the core. The mesh layer preferably is a low-density polyethylene. Most preferably, the low-density polyethylene mesh has a softening temperature range lower than the lower end of the softening temperature range of the high-density polyethylene filter material, and the mesh is tack-point interconnected to the filter material without having compromised the filter material. The low-density polyethylene of the mesh most preferably has a softening temperature range within the range of about 170–195° F. Such tack-point interconnections are polyethylene-to-polyethylene bonding at randomly-spaced points of contact of the mesh with the filter material.

The low-density polyethylene mesh layer and the high-density polyethylene filter material may be tack-point interconnected prior to the pleating, as described below. In some cases, however, the mesh layer and filter material may instead be tack-point interconnected after pleating, as described below.

The dimensions of the annular pleated filter elements described herein can vary widely. Often the pleated filter elements have small diameters, such as less than three inches, most usually on the order of 2.25 inches. The pleat dimensions of such pleated filter elements are usually on the order of 0.5 inch, or sometimes less, and the cores about which such pleated elements are wound usually have an outer diameter of about 1.25 inches. Thus, the curvature of such annular pleated filter elements is based on a fairly short radius.

In certain preferred embodiments, the pleated filter cartridge further includes a containment sleeve of polyethylene netting enclosing the annular filter element. Most preferably, the core and the endcaps are also of polyethylene, thus making a structure which is all polyethylene. This provides a pleated filter cartridge all portions of which have essentially the same chemical compatibilities with liquid filtration streams.

This pleated filter cartridge of this invention preferably has a cylindrical filter element having circular cross-sections. In addition to the cylindrical filter cartridge described above, this invention is also an annular pleated filter element of the type described above, without regard to the manner in which it is supported and mounted in a cartridge.

This invention is based in part on the conception that a pleated filter cartridge can include as the filter material the extremely thin (compared to non-wovens typically included in annular pleated filters) and highly flexible (i.e., highly flimsy—having low firmness) non-woven material described above. Due to the low firmness (high flexibility) of such filter material, and the material thinness of preferred embodiments which exacerbates such flexibility, the ability to have such material formed into an annular pleated filter cartridge was not and would not be apparent.

The characteristics of the filter material set forth in the paragraphs above mean that the filter material of the pleated filter cartridge has both excellent permeability (flow-through) and excellent filtering ability, which are important to the performance of pleated filter cartridges. The pleated filter cartridges of this invention are highly durable in various liquid filtering environments, providing significantly extended periods of useful life. Indeed, initial tests have indicated life span improvements in excess of 100% in comparisons involving the filtering of nylon "fines" from an aqueous stream.

The preferred non-woven flash-spun polyolefin filter material of the pleated filter cartridge of this invention provides an outside surface which is fairly smooth and capable of readily releasing particulates captured thereon. That is, particulates which are captured during filtering operations can be readily be released in back-washing operations, or otherwise.

In preferred embodiments, the pleated filter cartridge of this invention has a single layer of the filter material described above without a second filter layer of a different material. In some cases, inclusion of a second filter layer may reduce useful life span of the filter cartridge. However, in certain situations the inclusion of additional pleated filter layers, such as for pre-filtering purposes, may be desired. Annular pleated filter elements and pleated filter cartridges within the scope of this invention can have a variety of configurations and layers of various kinds.

Many physical characteristics, performance parameters and technical terms have been used above in this summary. The characteristics and parameters are in most cases determined in accordance with accepted tests; ASTM tests are referred to later in this document. Furthermore, definitions of various terms are provided for enhanced clarity of this document.

DETAILED DESCRIPTION OF PREFERRED EMBODIMENTS

Figures 1, 2:
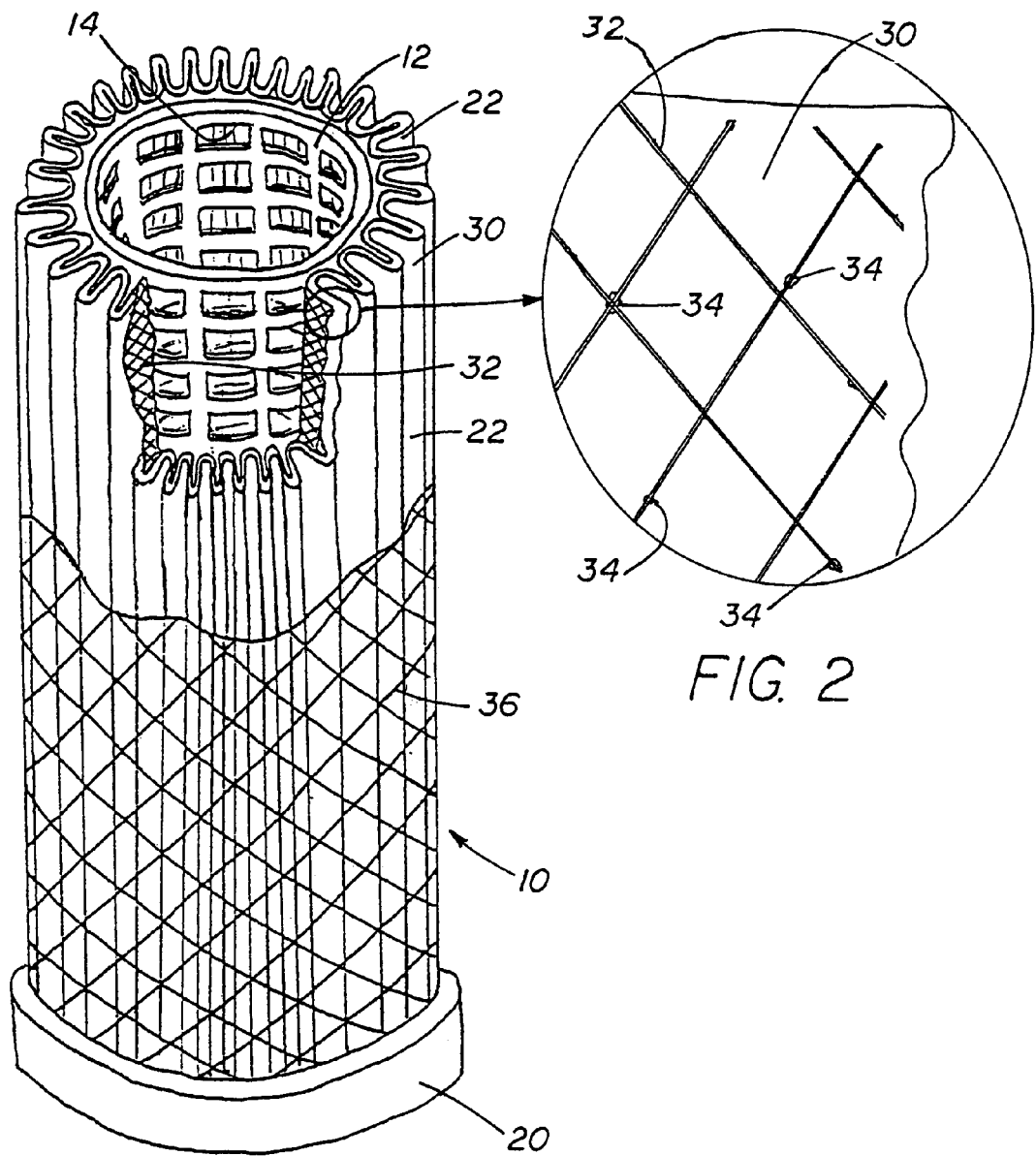
FIG. 1 is a fragmentary perspective view of a preferred annular pleated filter cartridge in accordance with this invention with one of the endcaps removed, including breakaway portions to better illustrate certain parts.
FIG. 2 is a magnified fragmentary view of a portion as indicated in FIG. 1.

The figures illustrate a pleated filter cartridge 10 in accordance with this invention. Filter cartridge 10 includes a rigid, cylindrical, hollow core 12 having a pattern of large apertures 14 therethrough to freely admit filtered liquid into the interior 16 of core 12, rigid top and bottom endcaps 18 and 20, and an annular pleated filter element 22 around core 12.

Figure 3:
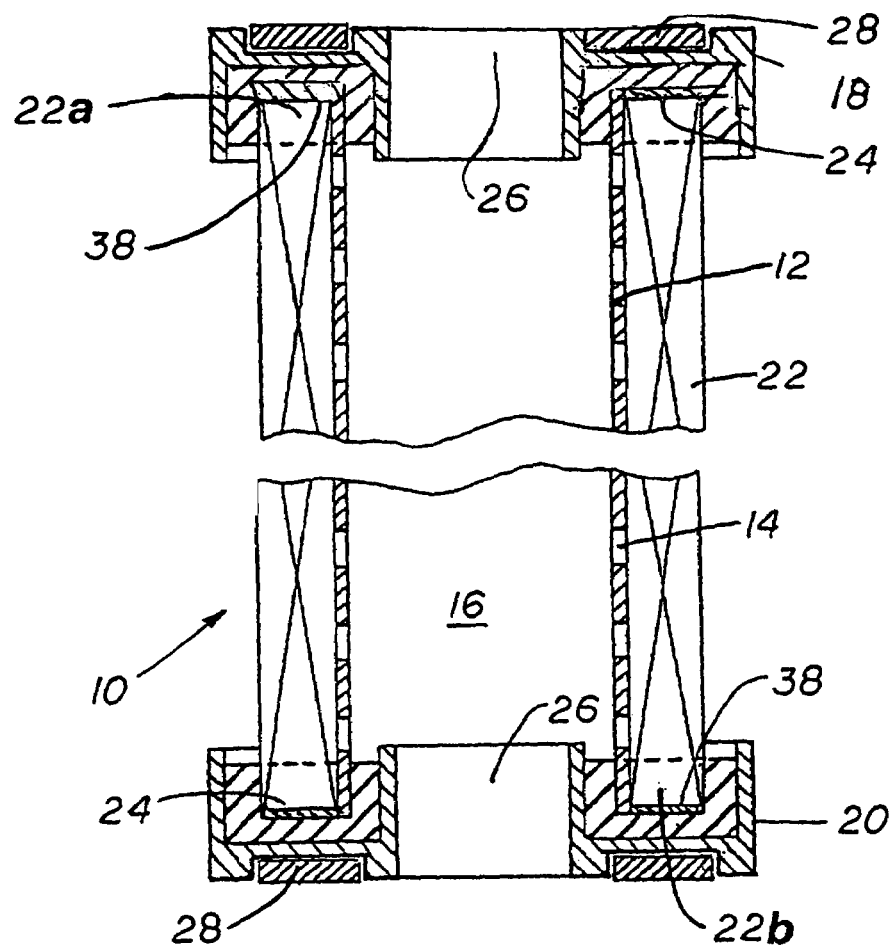
FIG. 3 is a fragmentary side sectional view of the device of FIG. 1, having the annular filter element illustrated schematically.

Annular pleated filter element 22 has opposite ends 22a and 22b each in sealing engagement with a corresponding endcap 18 or 20, as illustrated best in FIG. 3. Each of endcaps 18 and 20 is formed to have an annular well 24, and each annular well 24 sealingly receives one of the annular ends 22a or 22b of annular pleated filter element 22. Such sealing engagement is by means known in the art, as explained further below. Each of the opposite ends of core 12 is also inserted into and firmly held in a respective one of the annular wells 24 at a position just radially inward of annular pleated filter element 22. Each endcap 18 and 20 has a central end opening 26, such that liquid which has reached interior 16 of core 12 by passage through pleated filter element 22 can flow out of cartridge 10 through one of end openings 26. Each endcap 18 and 20 has an outer annular seal 28 to facilitate sealing engagement with the liquid-handling apparatus (not shown) with which pleated filter cartridge 10 is used.

Figure 4:
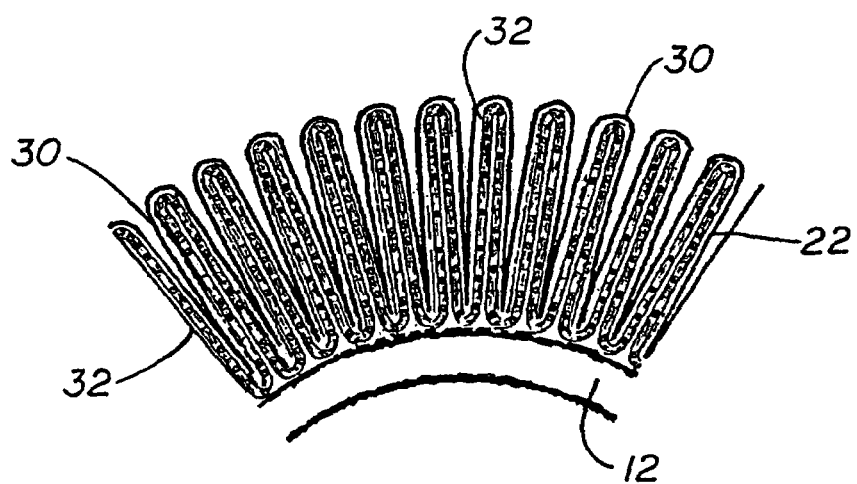
FIG. 4 is a schematic fragmentary sectional view taken along the annular pleated element of the device of FIG. 1.

As seen in FIGS. 1, 2 and 4, annular pleated filter element 22 has a single layer of filter material 30 which is an outer pleated layer, hereafter described, and an inner pleated layer which is an open mesh 32, hereafter described. Filter material 30 is a non-perforated non-woven material of flash-spun plexifilamentary high-density polyethylene fibrils, such material having a thickness of just under about 0.13 mm, and exhibits a pressure drop of less than about 1.5 psid at a flow rate of 10 gal/hr and a filtration efficiency of at least 99% of 1–2 micron particulates at a pressure differential of 30 psid. Filter material 30 has a mean flow pore size greater than 4 microns, while its nominal pore-size filtration rating is 1 micron, and a Gurley Hill porosity rating no greater than about 5 sec/100 cc. The material is corona-treated during manufacture for improved hydrophillicity.

Filter material 30 of pleated filter cartridge 10 is preferably Tyvek® SoloFlo® from DuPont. Such preferred material and the process for material manufacture are described in detail as part of the disclosure of PCT Patent Publication WO98/07905 of DuPont, Wilmington, Del. Acceptable materials include those referred to in Examples 29–32 of such document, and among these the materials of Examples 30–31 are preferred with the material of Example 31 being more preferred. Such material has been used commercially in certain liquid filter forms and functions, but not in annular pleated filter elements.

Mesh 32 is a low-density polyethylene having a softening temperature range within the range of about 170–195° F. and below the lower end of the softening temperature range of the high-density polyethylene of filter material 30, which is somewhat above 195° F. Filter material 30, described above, is dimensionally stable up to about 195° F., and it has been found that low-density mesh 32 can be tack-point interconnected to high-density polyethylene filter material 30 at temperatures within the softening range of 170–195° F. noted above without compromising the structure or filtering performance of filter material 30. FIG. 2 illustrates the nature of such tack-point interconnection, which may involve randomly spaced tack points 34 along the strands of mesh 32, such tack points being sites of polyethylene-to-polyethylene bonding which were made during layer-to-layer contact at appropriate temperatures.

Such tack-point interconnection may be prior to pleating of filter material 30 and mesh 32, such as by calendering such two layers together using a roller or rollers which provide suitable temperature and pressure. Alternatively, mesh 32 and filter material 30 may be tack-point interconnected after the mesh and filter material layers are pleated together. This may be carried out when the two pleated layers, before their formation into annular pleated filter element 22 as required for this invention, pass for an extended period of time through an oven which provides suitable mesh-softening temperatures of mesh 32 as it is in contact with filter material 32. Interconnection by widely spaced tack points 34 is sufficient to secure mesh 32 to filter material 30, thereby allowing mesh 32 to provide reinforcing and strengthening functions without interfering with filtration.

Annular pleated filter element 22 is contained within a containment sleeve 36 made of tough polyethylene netting material. The material for containment sleeve 36 is of sufficient strength to assure that pleated element 22 remains in place and in line despite any mishandling which might occur.

Core and endcaps 18 and 20 are also of polyethylene, in this case high-density polyethylene providing suitable rigidity and strength. The sealing engagement of annular ends 22a or 22b of annular pleated filter element 22 in annular wells 24 of endcaps 18 and 20 may be accomplished in any acceptable way. As illustrated in FIG. 3, such sealing engagement is by placement of annular ends 22a and 22b of filter element 22 in a polyethylene hotmelt adhesive 38 which cures to form acceptable sealing. Alternatively, a fusion-weld can be created by localized melting of the bottoms of annular wells 24, or a PVC plastisol can be mold-formed on annular ends 22a and 22b. For an all-polyethylene structure, the use of a polyethylene hotmelt adhesive is preferred.

Outer annular seals 28 are of suitable low-density polyethylene gasket material. Alternatively, any suitably resilient gaskets, including gaskets of rubber, may be used.

A description of various physical characteristics, performance parameters and technical terms used herein will be useful in understanding the characteristics of the preferred embodiments of this invention. In some cases, reference is made to standard ASTM tests and other tests.

"Permeability" of a filter material is a function of the differential pressure, the porosity and the area of the filter material. One measure of "permeability" is the "pressure drop" necessary to drive 10 gal/hr through a sample of the filter material 90 mm in diameter. This, of course, is expressed in pounds per square inch difference in pressure (psid).

The term "filtration efficiency" is measured using a procedure based on ASTM 795-82. Such test determines what percentage of particles in a particular size range in a stream of distilled water are retained by a filter material; it may be run using particles in the range of 0.5–150 microns. For example, under this method, a concentrated suspension of fine test dust is injected into water upstream of the filter material and the number of upstream particles in the size range of 1–2 microns is measured; after water flow through the filter material at a predetermined pressure differential occurs, the number of such 1–2 micron particles downstream of the filter material is measured. The filtration efficiency is percentage of such upstream particles which were not found downstream.

The term "mean flow pore size" refers to a measure of the filter pore size at which half of the total airflow through the sample occurs through pores larger than the mean, and half of the airflow occurs through pores smaller than the mean. It is measured using a Coulter-II porometer.

The term "Gurley Hill porosity" refers to a measure of the permeability of the sheet material for gaseous materials. It measures how long it takes a volume of gas (100 cc of air) to pass through a given area (a sample one inch in diameter) of the filter material when there is a predetermined pressure gradient across the material (4.9 inches of water). It is measured in accordance with TAPPI T-460 om-88 using a Lorentzen & Wettre Model 121D densometer. The result is given in seconds/100 cc.

The term "basis weight" refers to the weight of the filter material. It is given in $g/m^2$ and is determined by ASTM D-3776.

The term "plexifilamentary" as used herein means a three-dimensional integral network of a multitude of thin, ribbon-like, film-fibril elements of random length and with a mean film thickness of less than about 4 microns and a median fibril width of less than about 25 microns. In plexifilamentary structures, the film-fibril elements are generally coextensively aligned with the longitudinal axis of the structure and they intermittently unite and separate at irregular intervals in various places throughout the length, width and thickness of the structure to form a continuous three-dimensional network.

The term "tack-point interconnection" as used herein means interconnection by randomly-spaced tack points, such tacking caused by surface-to-surface bonds without addition of a separate adhesive material.

Many variations from the preferred embodiment described above are possible without departing from the invention. Some variations have already been described above, but a few additional points will be helpful.

Mesh 32, while preferably low-density polyethylene, can be of other materials, including without limitation polypropylene and nylon. Likewise, core 12 and endcaps 18 and 20 can be of materials other than polyethylene, such as polypropylene, nylon or a variety of other materials. Significant variations in the number of layers, the nature of layers, and the overall structure are possible.

While the principles of this invention have been described in connection with specific embodiments, it should be understood clearly that these descriptions are made only by way of example and are not intended to limit the scope of the invention. Many modifications and variations are possible within the scope of this invention, the nature of which is indicated by the following claims.

What is claimed is:

1. A pleated filter cartridge for removing particulates from liquid, the pleated filter cartridge being of the type including a perforate core, a pair of endcaps, and an annular filter element around the core formed by substantially axially-parallel pleats of of non-woven filter material, the filter element having opposite ends each in sealing engagement with one of the endcaps, characterized in that the filter element consists of a single layer of the filter material and a mesh layer, the single-layer filter material being a non-perforated non-woven material of flash-spun plexifilamentary high-density polyethylene fibrils, the filter material having a thickness of less than about 0.15 mm, a pressure drop of less than 4 psid at a flow rate of 10 gal/hr, and a filtration efficiency of at least 98% of 1–2 micron particulates at a pressure differential of 30 psid.

2. The pleated filter cartridge of claim 1 wherein the filter material has a pressure drop of less than about 1.5 psid at a flow rate of 10 gal/hr and the filtration efficiency is at least about 99% of 1–2 micron particulates at a pressure differential of 30 psid.

3. The pleated filter cartridge of claim 2 wherein the mean flow pore size of the filter material is greater than 4 microns while its nominal pore-size filtration rating is 1 micron.

4. The pleated filter cartridge of claim 2 wherein the filter material has a Gurley Hill porosity rating no greater than about 5 sec/100 cc.

5. The pleated filter cartridge of claim 1 wherein the filter material has a thickness less than or equal to about 0.13 mm.

6. The pleated filter cartridge of claim 1 wherein the filter material has a basis weight of less than about 45 $g/m^2$.

7. The pleated filter cartridge of claim 6 wherein the filter material has a thickness less than or equal to about 0.13 mm.

8. The pleated filter cartridge of claim 1 wherein the mesh layer is between the filter material and the core.

9. The pleated filter cartridge of claim 1 wherein the mesh layer is a low-density polyethylene.

10. The pleated filter cartridge of claim 9 wherein:
the high-density polyethylene filter material has a softening temperature range;
the polyethylene mesh has a softening temperature range lower than the lower end of the softening temperature range of the high-density polyethylene filter material; and
the polyethylene mesh is tack-point interconnected to the filter material without having compromised the filter material.

11. The pleated filter cartridge of claim 10 wherein the mesh layer and filter material were tack-point interconnected prior to pleating.

12. The pleated filter cartridge of claim 10 wherein the softening temperature range of the polyethylene mesh is within the range of 170–195° F.

13. The pleated filter cartridge of claim 1 further including a containment sleeve of polyethylene netting enclosing the annular filter element.

14. The pleated filter cartridge of claim 13 wherein the core and the endcaps are of polyethylene.

* * * * *